(12) United States Patent
Hattan

(10) Patent No.: US 6,497,528 B2
(45) Date of Patent: Dec. 24, 2002

(54) TURNBUCKLE

(76) Inventor: Mark Hattan, 707 Tularosa, Orange, CA (US) 92666

( * ) Notice: Subject to any disclaimer, the term of this patent is extended or adjusted under 35 U.S.C. 154(b) by 0 days.

(21) Appl. No.: 09/915,008

(22) Filed: Jul. 26, 2001

(65) Prior Publication Data

US 2002/0116821 A1 Aug. 29, 2002

Related U.S. Application Data

(63) Continuation of application No. 09/441,352, filed on Nov. 16, 1999, now Pat. No. 6,263,572.

(51) Int. Cl.[7] .................................................. F16B 7/06
(52) U.S. Cl. .............................. 403/43; 403/44; 403/47
(58) Field of Search ............................ 403/43, 44, 45, 403/46, 47, 48, 49, 164, 383, 384, 385, 436; 29/896.7

(56) References Cited

U.S. PATENT DOCUMENTS

| | | | | |
|---|---|---|---|---|
| 3,806,265 A | * | 4/1974 | Hattan ........................... 403/46 |
| 4,130,269 A | * | 12/1978 | Schreyer ........................ 403/45 |
| 4,198,174 A | * | 4/1980 | Boroweic et al. .............. 403/44 |
| 4,252,456 A | * | 2/1981 | Kallaes et al. ................. 403/343 |
| 5,165,137 A | * | 11/1992 | Amrein et al. ................. 403/43 |
| 5,702,196 A | * | 12/1997 | Petercsak ....................... 403/46 |
| 5,906,450 A | * | 5/1999 | Ng ................................. 403/46 |
| 5,908,261 A | * | 6/1999 | Bush et al. ..................... 403/43 |
| 6,050,737 A | * | 4/2000 | Russell .......................... 403/43 |

* cited by examiner

Primary Examiner—Anthony Knight
Assistant Examiner—Doug Hutton
(74) Attorney, Agent, or Firm—Robert E. Strauss

(57) ABSTRACT

A turnbuckle with a central link having internal right and left hand threads receives the ends of longitudinally split sections of a pair of shaft members which are threaded with complimentary right and left hand threads. The sections of the shafts are slidably engaged within the central link and a band of low friction material is placed between the opposing flat surfaces of the engaged shaft sections. The shafts can be sectioned into half sections, however, a preferred embodiment provides each of the shafts with a pair of quarter sections at 180-degree spacing.

10 Claims, 5 Drawing Sheets

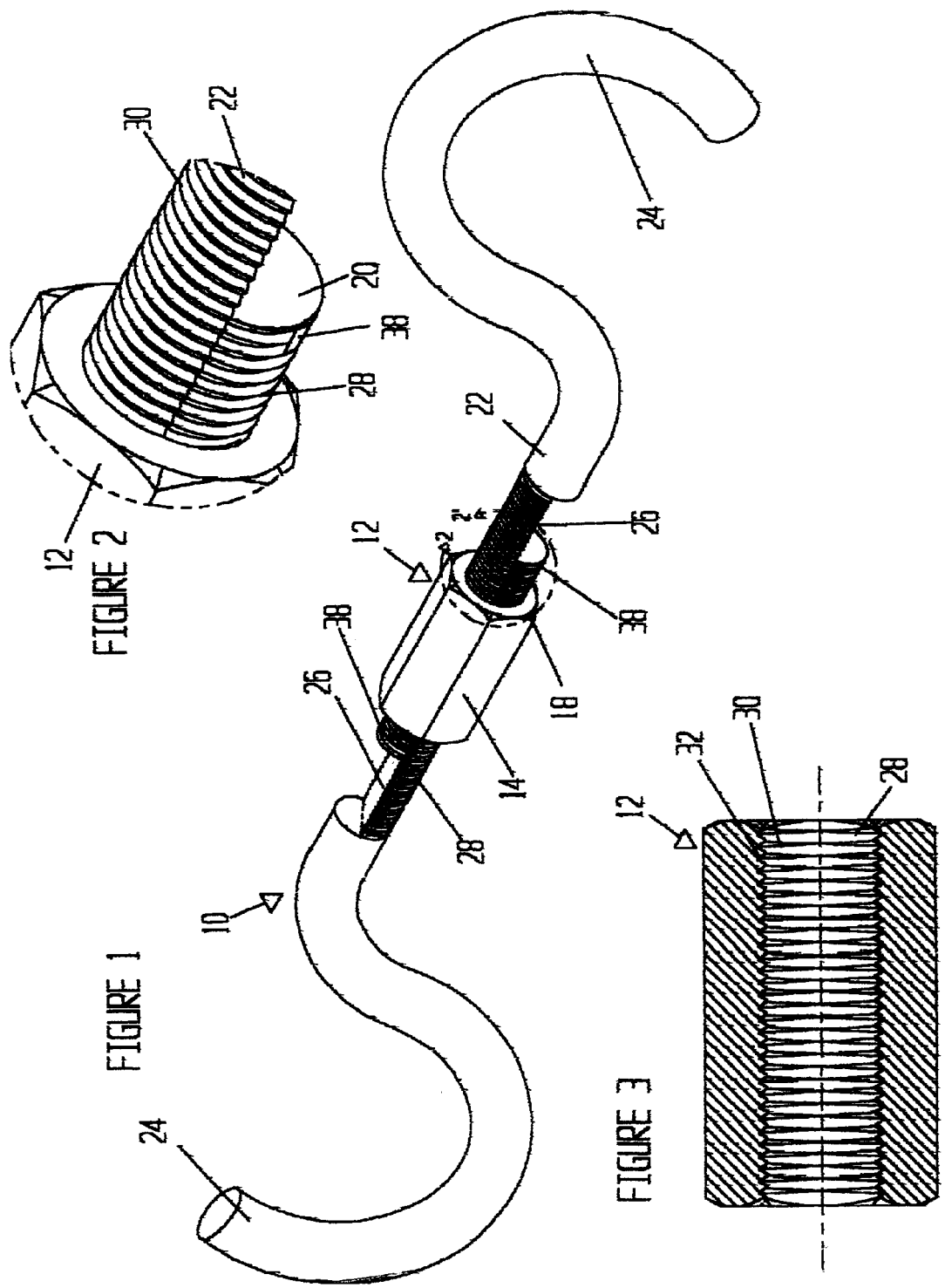

TURNBUCKLE

CROSS REFERENCE TO RELATED APPLICATIONS

This application is a continuation of application, Ser. No. 09/441,352, now U.S. Pat. No. 6,263,572.

BACKGROUND OF THE INVENTION

1. Field of Invention

This invention relates to a turnbuckle and, in particular to a turnbuckle which has an unlimited degree of expansion and contraction, and which eliminates cable twisting.

2. Brief Statement of the Prior Art

Turnbuckles are commonly used to secure the ends of cables, rods or other members, with a variable tensioning capability. A turnbuckle has a central link having opposite ends which are internally threaded with opposite oriented threads which receive compatibly threaded shafts bearing distal clasps such as hooks or loops. Rotation of the link member thereby extends or contracts the threaded shafts in the assembly, thus providing for variable tensioning of cables, etc., which are secured by the distal clasps of the shaft members.

There are a number of shortcomings in the conventional turnbuckle. The turnbuckle is awkward and difficult to use since the distal ends of the shafts are commonly attached to cables and the like which do not rotationally restrain the shafts. Consequently, adjustment of the tension on the cables by advancing or retracting the shafts in the link member usually requires one to grasp the shaft members, immobilizing these members while rotating the link member. Alternatively, one rotates the link member and entire assembly until sufficient torsion is developed in the cables to restrain the shafts, permitting their rotational movement in their threaded engagement with the link member. Another disadvantage of the conventional turnbuckle is that it has only a limited degree of expansion and contraction. Commonly the shafts are coaxial and their maximum travel in the assembly is no greater than one half the length of the link member and, commonly less as the link member often has a center rib which obstructs the inward movement of the shafts. The conventional turnbuckle is also bulky with a heavy, cast link member.

OBJECTIVES OF THE INVENTION

It is an objective of this invention to provide a turnbuckle which can be readily expanded or contracted simply by rotation of the link;

It is also an objective of this invention to provide a turnbuckle with unlimited degree of extension and contraction;

It is likewise an objective of this invention to provide a turnbuckle mechanism which can be readily incorporated in linear motion mechanisms; and It is an additional objective of this invention to provide a turnbuckle mechanism for synchronous reciprocal movement of two members.

It is a further objective of this invention to provide a turnbuckle which avoids twisting of cables.

BRIEF DESCRIPTION OF THE INVENTION

This invention comprises a turnbuckle mechanism in which a central link is provided with internal right and left hand compatible threads and which receives, at its opposite ends, one of a pair of longitudinally split externally threaded shafts which are threaded in opposite directions. The shafts are coaxially received in the internally threaded bore of the link and have distal clasps such as hooks or loops for attachment of cables, or other members such as rods or chains.

BRIEF DESCRIPTION OF THE DRAWINGS

The invention will be described with reference to the figures of which:

FIG. 1 is a perspective view of a turnbuckle according to the invention;

FIG. 2 is an enlarged view of the area within line 2–2' of FIG. 1;

FIG. 3 is a longitudinal, cross sectional view of the link of the turnbuckle of FIG. 1;

DESCRIPTION OF PREFERRED EMBODIMENTS

Figure 4:
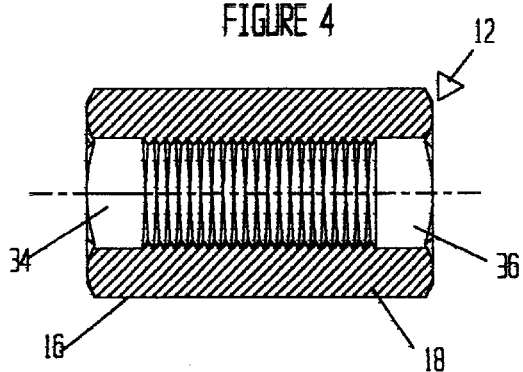
FIG. 4 is a longitudinal, cross sectional view of alternative link to that shown in FIG. 3.

Referring to FIG. 1, there is illustrated a turn buckle 10 according to the invention. The turnbuckle 10 has a central link 12 in the form of an elongated nut bearing wrench flats 14 on its exterior surface. In the illustration, the link 12 is hexagonally flatted. The internal through passage of the link 12 is threaded with right and left hand compatible threads coextensive its length, in a manner described and illustrated in greater detail in FIG. 3. Received in opposite ends 16 and 18 of the link 12 are shafts 20 and 22 having distal attachments such as hook ends, although other clasps such as loops or eyes, or even full threads can be used. Since rotation of the link 12 does not cause rotation of the shafts 20 and 22, these shafts can have threaded ends which are received in internally threaded nuts or tapped bores, thereby serving as clasp means. Each shaft has a longitudinally split half section 26 with a semicircular cross section which is externally threaded with either left hand threads 28 for shaft 20 or right hand threads 30 for shaft 22. The illustrated turnbuckle 10 is shown in a partially contracted configuration with the ends of each of the shafts 20 and 22 projecting through and beyond the opposite end of the link 12 thus illustrating the sliding relationship of the two shafts 20 and 22.

Referring now to FIG. 2, the external threaded appearance of the shafts members is apparent and, as shown, the upper shaft 22 bears right hand threads 30 while the lower shaft 20 bears left hand threads 28. The threads are of the same pitch and depth, i.e., are identical except being oriented in opposite directions.

Referring now to FIG. 3, there is illustrated a longitudinal sectional view of the link 12. As previously mentioned, the link 12 is in the form of an elongated hexagonally flatted nut and has a central bore 32 which is internally threaded with right hand threads 30 and with left hands threads 28 coextensive its entire length. This permits the 1 threaded shafts 20 and 22 which coact to restrain each other as the link 12 is rotated thereby permitting a simple single-handed expansion and contraction of the assembly simply by rotation of the link 12.

Referring now to FIG. 4, the link 12 can have, at its opposite ends 16 and 18, an unthreaded section 34 and 36 to facilitate orientation of the shafts 20 and 22 when they are initially installed in the link 12. The unthreaded sections 34 and 36 serve to orient the shafts 20 and 22 axially in the assembly, facilitating the initial engagement of these shafts.

Alternatively, the shaft members can have distal threads 38 upset as shown on FIG. 1, thereby preventing their complete removal from the assembly.

Figure 5:
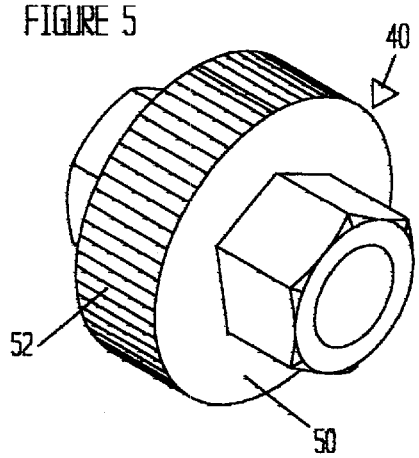
FIGS. 5 and 6 are perspective views of alternative links useful in the turnbuckle shown in FIG. 1.

Referring now to FIG. 5, there is illustrated a perspective view of an alternative link 40 which is provided with a hand tensioning wheel 50 of greater diameter than the body of the link member which can be provided with external grooves 52 for increased frictional grasping by a user.

Figure 6:
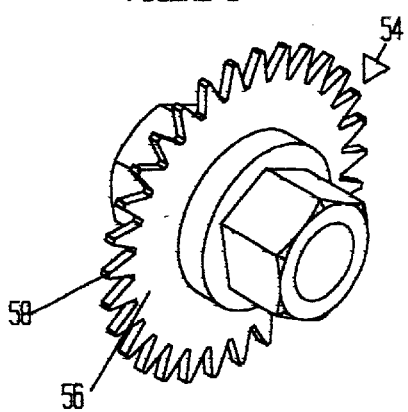

Alternatively, the link member can be provided with external gear teeth as shown in FIG. 6, in which the link 54 has a central circular flange 56 bearing a circumferential row of gear teeth 58 to be engaged by a suitable gear or rack drive in a gear drive. In this manner, the turnbuckle of the invention can be adopted to translate rotary motion to reciprocating, reverse, linear movement.

Figure 7:
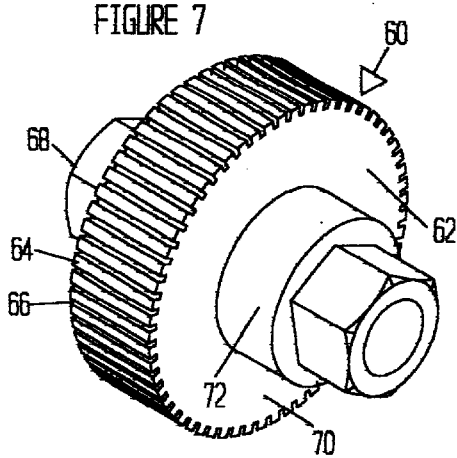
FIG. 7 is a perspective view of a link useful as an armature of an electrical motor.

Referring now to FIG. 7, the link can be externally configured as an armature of a conventional electric motor in which the link 60 has a central cylindrical body 62 with its external cylindrical surface 64 bearing evenly spaced splines 66 as conventional for armatures. Additionally, the opposite ends 68 and 70 of the link 60 are provided with stub shafts 72 which can be received in the bearing journals of an electric motor. The central through bore of the link 60 is threaded with right and left hand threads in the manner described with reference to FIGS. 3 and 4.

Figure 8:
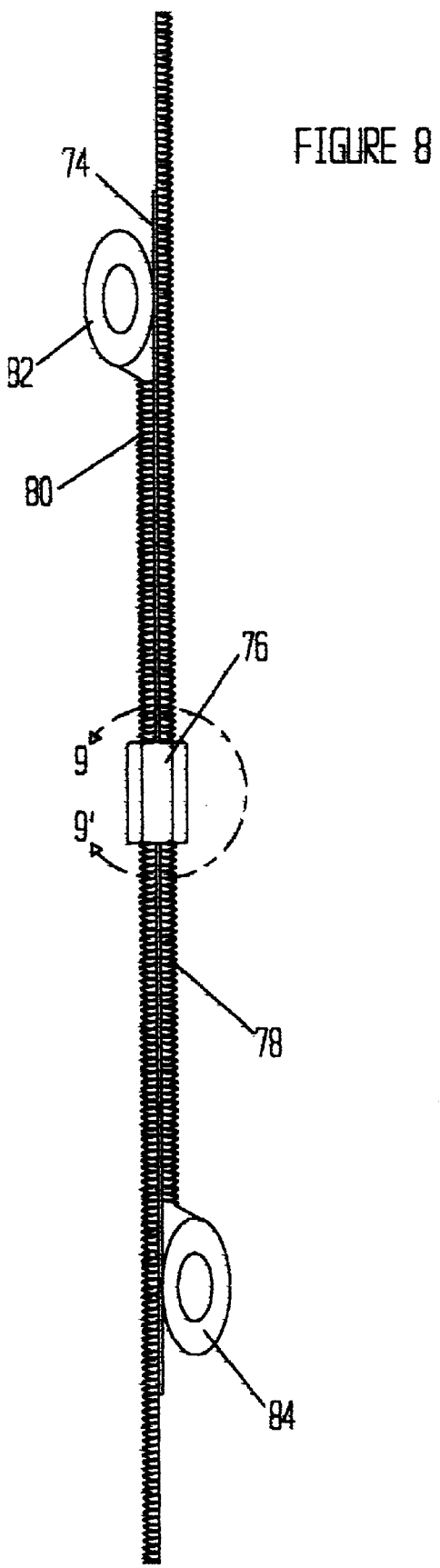
FIG. 8 is a view of a turnbuckle having an expansion/contraction distance limited only by the length of the threaded shaft members.
Figure 9:
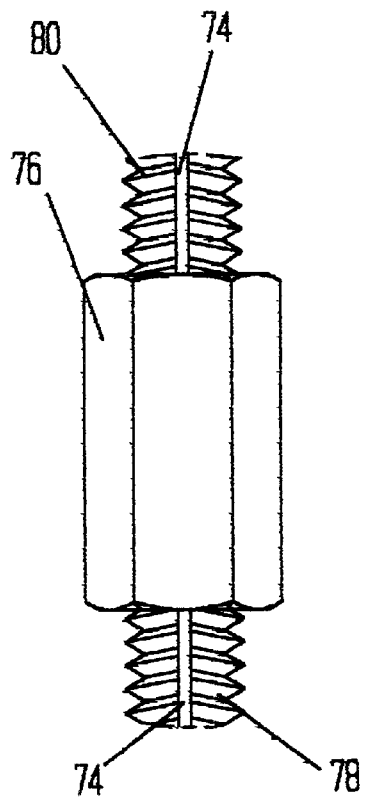
FIG. 9 is an enlarged view of the area within line 9–9' of FIG. 8.

FIG. 8 illustrates an embodiment in which the shaft members 78 and 80 are split their entire lengths, thereby permitting the threaded shaft of each shaft member 78 and 80 to be fully advanced or retracted by the link 76, thus achieving an extendible range from a distance equal to the lengths of the link and end eyes 82 and 84 to a full extension equal to the sum of the lengths of the shaft members 78 and 80 less twice the length of the link 76, FIG. 9 is an enlarged view of the turnbuckle shown in FIG. 8. This also illustrates the preferred manufacture wherein the shaft members are formed as conventional threaded shafts which are then split by suitable machining. Examples of various machining techniques which can be used include sawing, EDM machining, laser jet cutting and cutting with a high pressure water jet which includes an abrasive powder suspended in the water. The latter technique is preferred for cost and efficiency. These machining techniques result in removing a thin layer of metal, forming a thin gap between the smooth opposing flat surfaces of the right and left shaft members. Typically this gap has a thickness from 0.02 to about 0.04 inch, usually from 0.025 to 0.030 inch. Preferably, this gap is filled with a band of a low friction material which can be of plastics such as Teflon, on resistant metal such as stainless steel, copper, etc. This is shown in FIG. 9 as a thin flat band 74, which can extend the length of the shaft members 78 and 80; see FIG. 8. The band 74 is attached or bonded to either one of the two shaft members and for this purpose mechanical attachment or bonding with adhesive or welding can be used, as appropriate for the applications and materials. The width of the band 74 can also be varied as desired to provide a control of the degree of self-locking of the mechanism with thick bands providing greater self-locking than thin bands.

Figure 10:
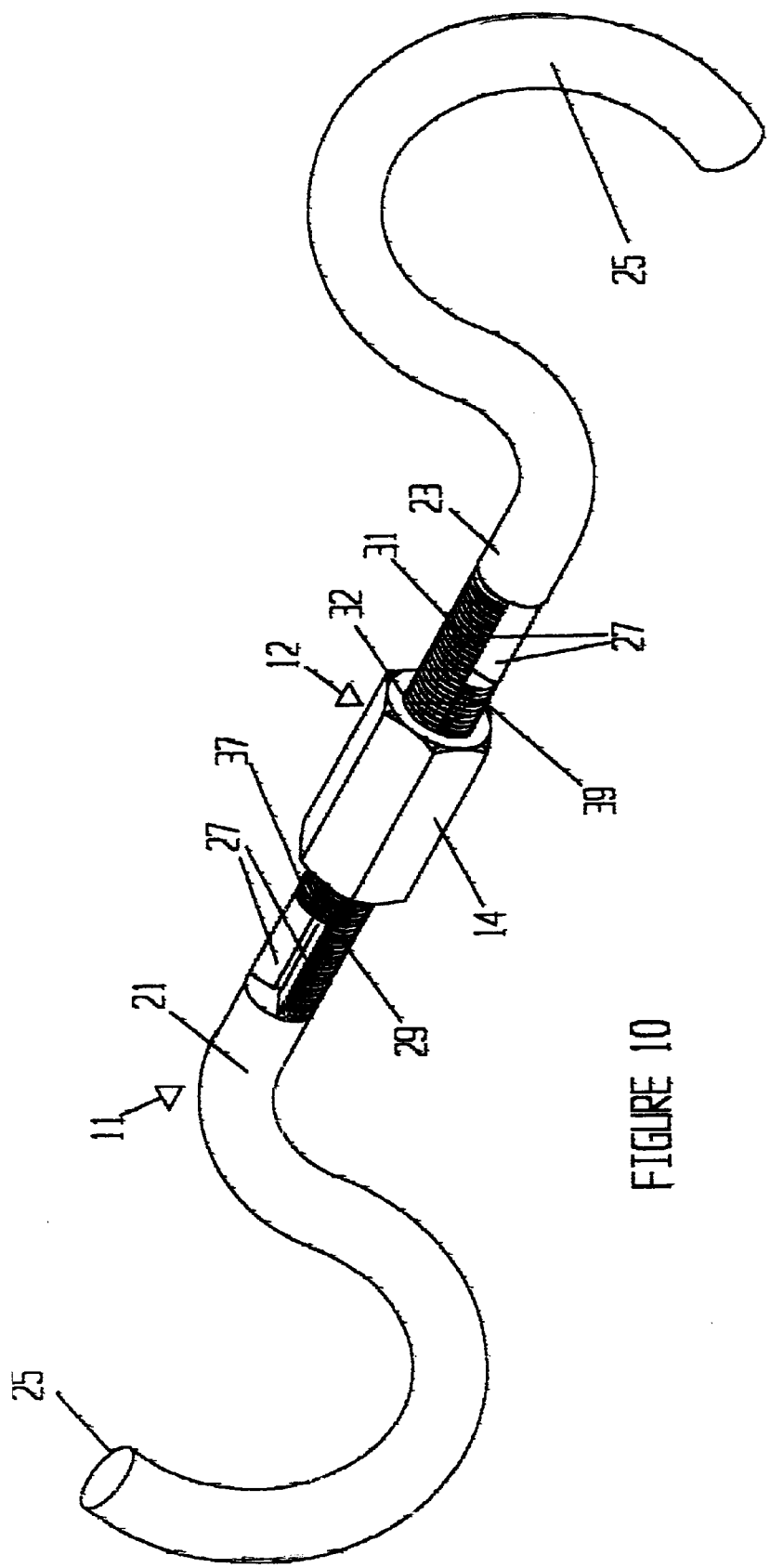
FIG. 10 is a perspective view of an alternative turnbuckle.

Referring to FIG. 10, there is illustrated a turnbuckle 11 which is an alternative to that shown in FIG. 1. The turnbuckle 11 has a central link 12 which can be the same as that shown in FIG. 1, with hexagonal flats 14 on its exterior surface. As with link 12 of FIG. 1, the internal through passage of the link 12 is threaded with right and left hand compatible threads coextensive its length. Received in opposite ends of the link 12 are shafts 21 and 23 having distal attachments such as hook ends 25, although other clasps such as loops or eyes, or even full threads can be used. Each shaft has two substantially identical, longitudinally split quarter sections 27 spaced at opposite, or 180 degree angular quarter sections of the opposing shaft. The quarter sections are provided with left hand threads 29 for shaft 21 or right hand threads 31 for shaft 23. The illustrated turnbuckle 11 is shown in a partially contacted configuration with the ends of each of the quarter sectioned shafts 21 and 23 projecting through and beyond the opposite end of the link 12 thus illustrating the sliding relationship of the two shafts 21 and 23. The shafts 21 and 23 with the illustrated longitudinally quarter split ends can be fabricated by molding of a suitable polymer, e.g., Nylon, or can be cut from a single threaded shaft by machining with a jet of high pressure water or aqueous cutting fluid.

Figure 11:
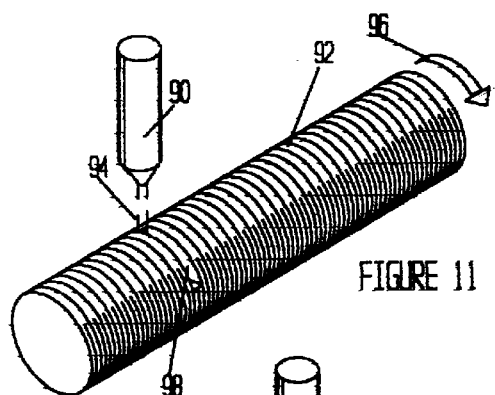
FIGS. 11–14 illustrate the steps of manufacturing the shaft members for the alternative turnbuckle shown in FIG. 10.
Figure 13:
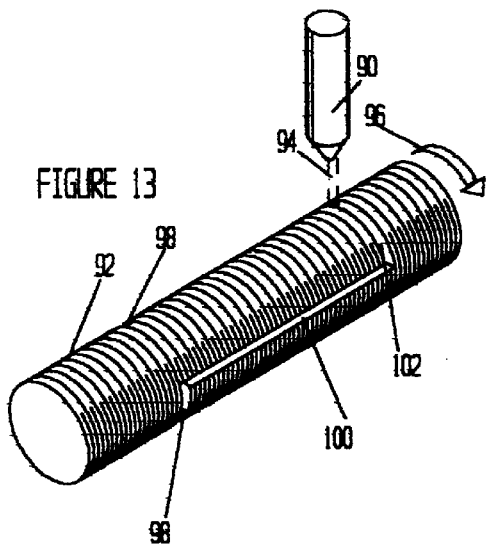
Figure 12:
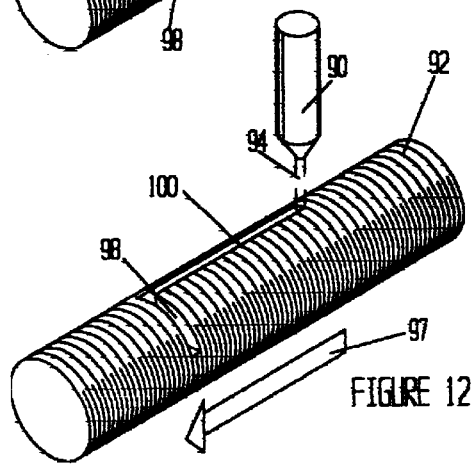
Figure 14:
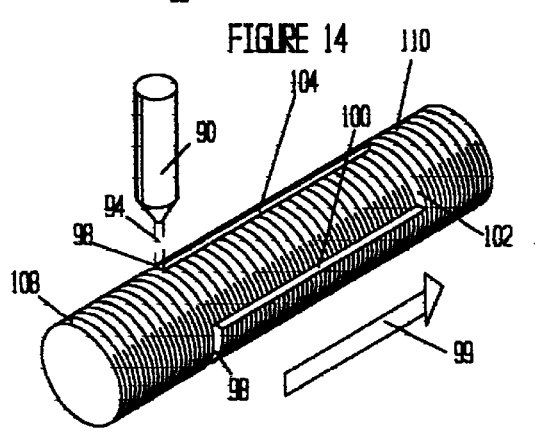
Figure 15:
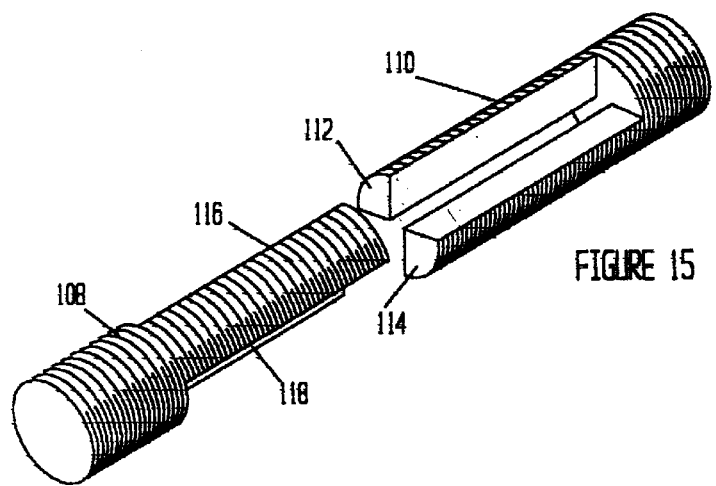
FIG. 15 is a view of the shaft members formed from the manufacturing steps shown in FIGS. 11–14.

FIGS. 11–14 illustrate the fabrication of the turnbuckle members. In FIG. 11, a threaded blank shaft 92 is supported beneath a cutting element such as a high pressure jet cutting tool 90 which directs a stream 94 of aqueous cutting fluid against the shaft while the shaft is rotated 90 degrees as shown by arrowhead line 96. Alternatively, a laser cutting tool can be used. This forms two, 90-degree sector slots such as 98 in the shaft. For illustration purposes, the thicknesses of the slots which are formed by the cutting tool is exaggerated. The shaft is then moved axially relative to the cutting tool 90 as shown by the arrowhead line 96 of FIG. 13 forming 90-degree sector slots such as 102 in the shaft. In the final cutting step shown in FIG. 14, the shaft is moved axially relative to the cutting tool 90 as shown by arrowhead line 99. This forms an axial slot 104 which intersects the sector slot 98 cut in the first step, shown in FIG. 11. The last step severs the shaft 92 into two turnbuckle members 108 and 110 which are shown separated in FIG. 15. Each member 108 and 110 has identical, longitudinally split quarter sections, 112 and 114 for member 108 and 116 and 118 for member 110. These longitudinally split quarter sections are spaced at opposite, 180 degree angular spacing. The quarter sections 112 and 114 of shaft member 108 are complimentary to the quarter sections 116 and 118 of shaft member 110 thereby permitting the longitudinal engagement of the members 108 and 110 Both members 108 and 110, however, have exterior threads of the same direction, i.e., if shaft 92 has right hand threads, both members 108 and 110 will have right hand direction threads. The cutting steps are also performed on shafts with threads of opposite direction, e.g., left-hand threads of opposite direction, e.g., left-hand threads, and then one member formed by cutting a shaft with right-hand threads is paired with a member having complimentary quarter sections which is formed by cutting a shaft with left-hand threads and the pair are secured together with a link 12 shown in FIGS. 1 and 10. Fasteners, such as hooks, eyelets, nuts, etc., can be threaded onto the full shaft ends of the members 108 and 110.

An advantage of the invention which facilitates fabrication is that the shaft members can be provided with any of a wide variety of distal attachments such as hooks, loops or full threads for attachment of cables, rods or similar members.

Another advantage of the invention is that it provides for reverse, linear movement of the two shaft members in amounts limited only by the shaft lengths of these members. This is illustrated in FIG. 8 in which a link 76 receives opposite shaft members 78 and 89 and their entire lengths, thereby permitting sliding movement of each shaft member past the other and providing a turnbuckle mechanism capable of contraction and expansion through distances substantially the entire combined length of the shaft members.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. An improvement in a turnbuckle having a link with an internally threaded link section and, received in opposite ends thereof, one each of a pair of threaded shafts, each of said shafts having a clasp means at a distal end, the improvement comprising:
   a. on each of said shafts, a link-engaging terminal section comprising at least one longitudinally split section that is complimentary to the at least one longitudinally split section of the other of said shafts to permit the longitudinal engagement of the terminal sections of said shafts;
   b. right-hand external threads coextensive with the at least one longitudinally split section of one of said shafts, and left-hand external threads coextensive with the at least one longitudinally split section of the other of said shafts;
   c. right-hand and left-hand internal threads coextensive along an internal wall of said threaded link section; and
   d. a separation band of low frictional characteristic plastics or corrosion resistant metals between the mating terminal sections of said shafts.

2. The turnbuckle of claim 1 wherein said longitudinally split sections are half sections.

3. The turnbuckle of claim 1 wherein said longitudinally split sections are quarter sections.

4. The turnbuckle of claim 1 wherein said link comprises an elongated nut having an external surface with grasping means.

5. The turnbuckle of claim 4 wherein said grasping means comprises at least on longitudinal flat one the external surface of said nut.

6. The turnbuckle of claim 1 wherein said clasp means comprises a hook end on said shafts.

7. The turnbuckle of claim 1 wherein said clasp means comprises a closed loop end on said shafts.

8. The turnbuckle of claim 1 wherein said clasp means comprises a threaded full diameter end of said shafts.

9. An improvement in a turnbuckle having a link with an internally threaded link section and, received in opposite ends thereof, one each of a pair of threaded shafts, each of said shafts having a clasp means at a distal end, the improvement comprising:
   a. on each of said shafts, a link-engaging terminal section comprising a pair of longitudinally split quarter sections that are complimentary to the pair of longitudinally split quarter sections of the other of said shafts to permit the longitudinal engagement of the terminal sections of said shafts;
   b. right-hand external threads coextensive with the quarter sections of one of said shafts, and left-hand external threads coextensive with the quarter sections of the other of said shafts; and
   c. right-hand and left-hand internal threads coextensive along an internal wall of said threaded link section.

10. The turnbuckle of claim 9 including separation bands of low frictional characteristic plastics or corrosion resistant metals, one each located between the mating surfaces of said quarter sections of said shaft members.

* * * * *